(12) United States Patent
Zhao

(10) Patent No.: US 10,198,244 B1
(45) Date of Patent: Feb. 5, 2019

(54) HEAD-MOUNTED DEVICE, HEADPHONE APPARATUS AND SEPARATION CONTROL METHOD FOR HEAD-MOUNTED DEVICE

(71) Applicant: SHENZHEN ROYOLE TECHNOLOGIES CO. LTD., Shenzhen, Guangdong (CN)

(72) Inventor: Cong Zhao, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/069,098

(22) PCT Filed: Jan. 26, 2016

(86) PCT No.: PCT/CN2016/072151
§ 371 (c)(1),
(2) Date: Jul. 10, 2018

(87) PCT Pub. No.: WO2017/128040
PCT Pub. Date: Aug. 3, 2017

(51) Int. Cl.
*H04R 1/10* (2006.01)
*G06F 3/16* (2006.01)
*G10L 15/22* (2006.01)
*G06F 3/0354* (2013.01)
(Continued)

(52) U.S. Cl.
CPC .......... *G06F 3/165* (2013.01); *G06F 3/03547* (2013.01); *G06F 3/147* (2013.01); *G10L 15/22* (2013.01); *H04R 1/1008* (2013.01); *H04R 1/1041* (2013.01); *G06F 3/0482* (2013.01); *G10L 2015/223* (2013.01); *H04R 2499/15* (2013.01)

(58) Field of Classification Search
CPC .......... H04R 1/10; H04R 1/028; H04R 1/344; H04R 1/1008; H04R 1/1041; H04R 2499/15; H04R 2420/09; H04N 13/344; H04N 13/289; G06F 3/14; G06F 3/165; G06F 3/147; G06F 3/03547; G06F 3/0482; G10L 15/22; G10L 2015/223
See application file for complete search history.

(56) References Cited

U.S. PATENT DOCUMENTS 5,815,126 A * 9/1998 Fan ...................... G02B 27/017
345/7
2005/0256675 A1 * 11/2005 Kurata ............... G02B 27/0093
702/153
(Continued)

*Primary Examiner* — Thang V Tran
(74) *Attorney, Agent, or Firm* — Hauptman Ham, LLP

(57) ABSTRACT

A head-mounted device, a headphone apparatus, and a separation control method for the head-mounted device, the separation control method includes following steps: detecting whether the headphone apparatus of the head-mounted device is separated from the display apparatus of the head-mounted device; if yes, controlling the head-mounted device to enter an audio playing mode; and receiving an input signal generated by an input unit of the head-mounted device in response to an input operation, and controlling to execute a corresponding audio playing control function according to the input signal. The head-mounted device may continue to use the headphone apparatus conveniently when the headphone apparatus is separated from the display apparatus.

20 Claims, 3 Drawing Sheets

(51) Int. Cl.
*G06F 3/147* (2006.01)
*G06F 3/0482* (2013.01)

(56) References Cited

U.S. PATENT DOCUMENTS

| | | | | |
|---|---|---|---|---|
| 2006/0238878 A1* | 10/2006 | Miyake | ............. | G02B 27/0176 359/630 |
| 2009/0115687 A1* | 5/2009 | Chiaki | ............... | G02B 27/0176 345/8 |
| 2010/0188314 A1* | 7/2010 | Miyake | ............. | G02B 27/0176 345/8 |
| 2012/0039481 A1* | 2/2012 | McClain | ............. | H04R 1/1066 381/74 |
| 2014/0133670 A1* | 5/2014 | Lee | ...................... | H04R 5/0335 381/74 |
| 2017/0052378 A1* | 2/2017 | Yang | ................. | G02B 27/0176 |
| 2017/0055057 A1* | 2/2017 | Yang | ................. | G02B 27/0176 |
| 2017/0075121 A1* | 3/2017 | Chen | ................. | G02B 27/0176 |
| 2017/0090201 A1* | 3/2017 | Guo | ................... | G02B 27/0176 |

* cited by examiner

HEAD-MOUNTED DEVICE, HEADPHONE APPARATUS AND SEPARATION CONTROL METHOD FOR HEAD-MOUNTED DEVICE

RELATED APPLICATIONS

The present application is a National Phase of International Application Number PCT/CN2016/072151, filed Jan. 26, 2016.

TECHNICAL FIELD

This disclosure relates to wearable devices, and more particularly relates to a head-mounted device, a headphone apparatus of the head-mounted device, and a separation control method for the head-mounted device.

BACKGROUND

Current head-mounted device generally includes a display apparatus and a headphone apparatus, the display apparatus is configured to output display frames, the headphone apparatus is configured to output audio signals. In some scenarios, maybe there is only need to listen to audio signals, then the display apparatus is redundant. However, in general head-mounted device, the display output is usually achieved by the display apparatus, when the display apparatus is separated from the headphone apparatus, the user would not see a menu interface and other display contents, thus leading to execute audio control operation or other operations is inconvenient.

SUMMARY

Embodiments of the invention provide a head-mounted device, a headphone apparatus, audio playing control may be continue executed conveniently when the headphone apparatus is separated from the display apparatus, facilitate the use of the user.

A head-mounted device provided by an embodiment of the present disclosure, including a display apparatus and a headphone apparatus, the headphone apparatus includes a first connection port, the display apparatus includes a second connection port, the first connection port is capable of connecting to the second connection port or separating from the second connection port. Therein, the head-mounted device further includes an input unit and a control unit. The input unit is configured to generate an input signal in response to an input operation. The control unit is configured to control the head-mounted device to enter an audio playing mode when detecting the first connection port of the headphone apparatus is separated from the second connection port of the display apparatus. Therein, in the audio playing mode, the control unit receives the input signal generated by the input unit in response to the input operation and controls to execute corresponding audio playing control function according to the input signal.

A headphone apparatus, including a first connection port configured to connect to a display apparatus; the headphone apparatus is configured to combine the display apparatus to form a head-mounted device; therein, the headphone apparatus further includes an input unit and a control unit. The input unit is configured to generate an input signal in response to an input operation. The control unit is configured to control the head-mounted device to enter an audio playing mode when detecting the first connection port of the headphone apparatus is separated from the second connection port of the display apparatus. Therein, in the audio playing mode, the control unit receives the input signal generated by the input unit in response to the input operation and controls to execute corresponding audio playing control function according to the input signal.

An separation control method for a head-mounted device, the method includes: detecting whether a headphone apparatus of the head-mounted device is separated from a display apparatus of the head-mounted device; if yes, controlling the head-mounted device to enter an audio playing mode; and receiving an input signal generated by an input unit of the head-mounted device in response to an input operation, and controlling to execute a corresponding audio playing control function according to the input signal.

The head-mounted device, the headphone apparatus, and the separation control method for the head-mounted device of the present disclosure, the audio playing control may be continue executed conveniently when the headphone apparatus is separated from the display apparatus.

BRIEF DESCRIPTION OF THE ACCOMPANYING DRAWINGS

To describe the technology solutions in the embodiments of the present invention more clearly, the following briefly introduces the accompanying drawings required for describing the embodiments. Apparently, the accompanying drawings in the following description show merely some embodiments of the present invention, Those of ordinary skill in the art may also derive other obvious variations based on these accompanying drawings without creative efforts.

Figure 4:
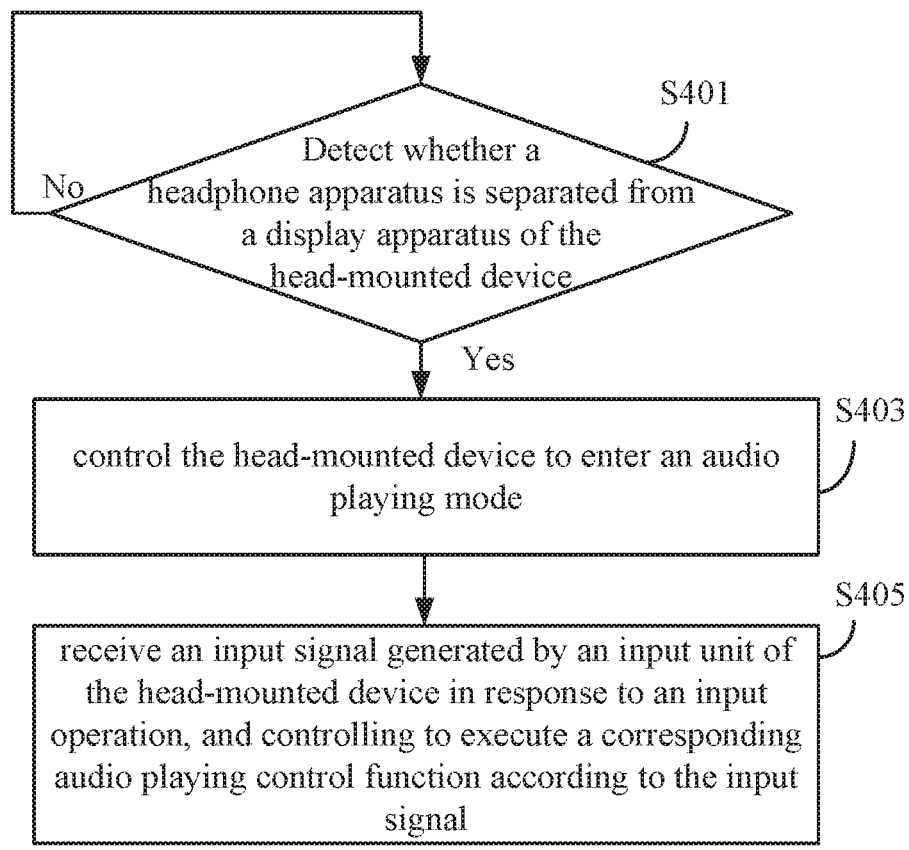

FIG. 4 flowchart diagram illustrating a separation control method for a head-mounted display device, in accordance with an embodiment of the present disclosure.

DETAILED DESCRIPTION OF ILLUSTRATED EMBODIMENTS

The technical solution in the embodiments of the present invention will be described clearly and completely hereinafter with reference to the accompanying drawings in the embodiments of the present invention. Apparently, the described embodiments are merely some but not all embodiments of the present invention. All other embodiments obtained by a person of ordinary skill in the art based on the embodiments of the present invention without creative efforts shall fall within the protection scope of the present invention.

Figure 1:
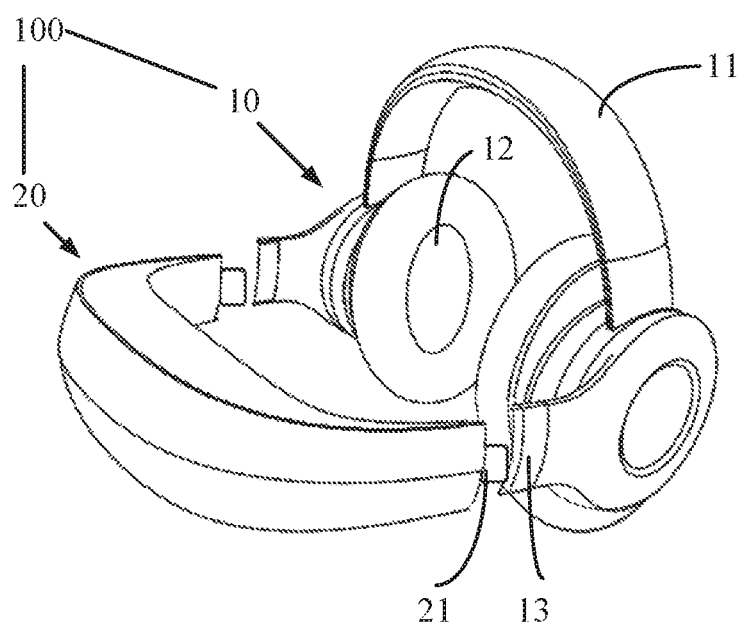
FIG. 1 is a schematic diagram of a head-mounted display device, in accordance with an embodiment of the present disclosure.

Referring to FIG. 1, which is a schematic diagram of a head-mounted device 100, in accordance with an embodiment of the present disclosure. As shown in FIG. 1, the head-mounted device 100 includes a headphone apparatus 10 and a display apparatus 20. The headphone apparatus 10 includes a headphone annular belt 11, two headphone receivers 12 located at two ends of the headphone annular belt 11 and connected to each other via the headphone annular belt 11, and a first connection port 13. The display apparatus 20 includes a second connection port 21. The first connection port 13 of the headphone apparatus 10 may connect to the second connection port 21 of the display apparatus 20 or separate from the second connection port 21 of the display apparatus 20, thus to make the headphone apparatus 10 to connect to the display apparatus 20 or separate from the display apparatus 20.

Figure 2:
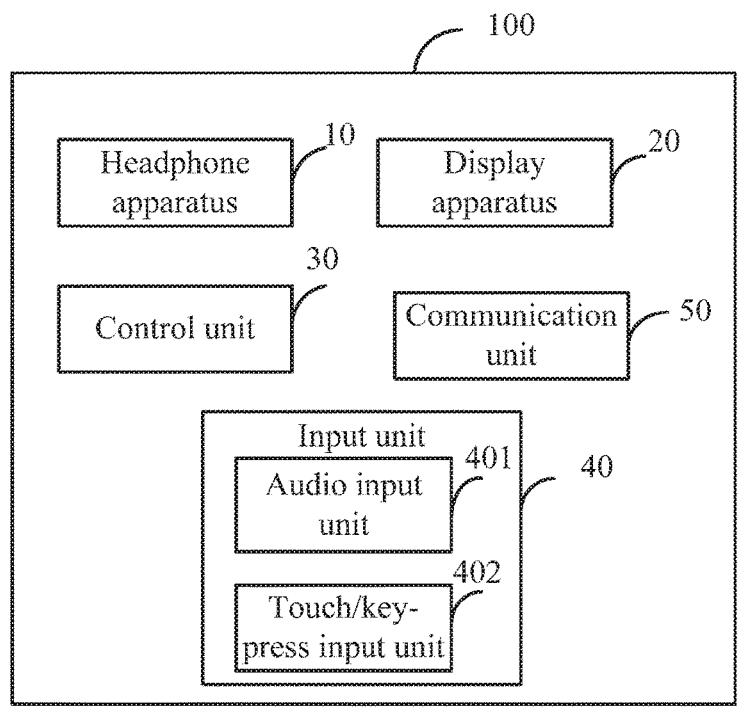
FIG. 2 is a functional block diagram of a head-mounted display device, in accordance with an embodiment of the present disclosure.

Referring to FIG. 2 together, which is a functional block diagram of the head-mounted device 100. The head-mounted display device 100 further includes a control unit 30 and an input unit 40. The input unit 40 is configured to generate an input signal in response to an input operation. The control unit 30 is configured to control the head-mounted device 100 to enter an audio playing mode when detecting the first connection port 13 of the headphone apparatus 10 is separated from the second connection port 21 of the display apparatus 20. In the audio playing mode, the control unit 30 receives the input signal generated by the input unit 40 in response to the input operation and controls to execute corresponding audio playing control function according to the input signal.

Therein, when the control unit 30 detects the first connection port 13 of the headphone apparatus 10 is separated from the second connection port 21 of the display apparatus 20, the control unit 30 further judges whether there is any function related to display is running. For example the function maybe a video playing function, a picture playing function, a photo capturing function, and so on. If yes, then controls to close the function related to display automatically. At this time, the control unit 30 only control to execute functions related to audio playing control. Therein, the audio playing mode means that the controls unit 30 only control to execute functions related to audio playing control.

The input unit 40 includes an audio input unit 401. The audio input unit 401 is configured to convert user's speech to an input signal containing speech content information. The control unit 30 is configured to control to execute a corresponding audio playing function according to the speech content information of the input signal.

For example, the speech content information of the input signal may include a category of song, such as, the speech content information may include a singer, a song style, and other contents. The control unit 30 determines all songs of the singer and all songs corresponding to the song style of the head-mounted device 100, and controls to play the songs of corresponding category. For example, when the speech content information of the input signal includes the category of song, such as "children's song", the control unit 30 determines the songs whose category are children's song, and controls to play the songs whose category are children's song. In one embodiment, the control unit 30 further judges whether receives the input signal within a predetermined time period (such as 2 seconds) after determining the songs of the corresponding category, and controls to play the songs of the category automatically when there is no input signal being received within the predetermine time period.

In one embodiment, the speech content information of the input signal may include a speech control command, for example: "reporting names of all of songs", "loop playing the songs", "playing the songs in sequence", "play songs of XX category", and so on. The control unit 30 controls to play the names of all of songs, controls to loop play the songs of a current playlist, controls to play the songs of the current playlist in sequence, controls to play songs of the XX category, and so on, in response to the speech control command of the input signal.

As shown in FIG. 2, the input unit 40 further includes a touch/key-press input unit 402, the touch/key-press input unit 402 includes at least one of a touch input apparatus and a key-press input apparatus. The touch/key-press input unit 402 is configured to generate a corresponding touch signal and/or a key-press signal in response to user's operation. The control unit 30 controls to execute the corresponding audio playing control function in response to the touch signal and/or the key-press signal generated by the touch/key-press input unit 402. The audio playing control function includes, but not limited to volume adjustment control, fast forward/fast backward control, songs switching control, and/or switching control between states of pause playing songs and playing songs. For example, the control unit 30 controls to switch the songs in response to a touch signal corresponding to a first touch operation, such as the touch signal corresponding to a horizontal sliding operation; and/or controls to adjust the volume in response to a touch signal corresponding to a second touch operation, such as the touch signal corresponding to a vertical sliding operation; and/or controls to switch between the states of pause playing songs and playing songs, in response to a touch signal corresponding to a third touch operation, such as the touch signal corresponding to double-click operation. The control unit 30 may further control to loop play songs of one playlist or loop play a current song in response a touch signal corresponding to a fourth touch operation, and so on.

Therein, in the audio playing mode, the control unit 30 may further execute corresponding audio playing control function in response to particular key-press signals. For example, the control unit 30 controls to switch a song forward in response to a first key-press signal generated by double clicking a scroll up key, controls to switch a song backward in response to a second key-press signal generated by double clicking a scroll down key, controls to increase the volume in response to a third key-press signal generated by single clicking the scroll up key, and control to decrease the volume in response to a fourth key-press signal generated by single clicking the scroll down key, and so on.

Which is should be understood, the above examples are only illustrated descriptions, and are not used to limit the control operation manner of the present disclosure, the first, second, third, and fourth touch operations may be any touch manner, include but not limited to particular touch positions, touch paths, the first, second, third, and fourth key-press signals maybe generated by physical keys respectively corresponding to the first, second, third, and fourth key-press signals, and also may be generated by reusing physical keys related to display control in the audio playing mode, as long as the defined touch manner, and the physical keys are associated to corresponding audio playing control functions in the audio playing mode.

Therein, the control unit 30 controls a system menu to jump to a music playing menu when detecting the first connection port 13 of the headphone apparatus 10 is separated from the second connection port 21 of the display apparatus 20. Therefore, the input signals generated by the input unit 40 in response to a clicking operation, a scrolling operation and so on may be applied to the current music playing menu. The control unit 30 further determines the menu item, icon or song being selected currently, and controls the headphone apparatus 10 to output prompt sound to prompt the menu item, icon or song selected by the user currently, thus to prompt an object selected by the user currently. The control unit 30 further controls to open the menu item, the icon and the song according to an input signal generated by the input unit 40 in response to a selection confirming operation. Therein, the selection confirming operation maybe an operation of pressing a key for a long time, or an operation for pressing any position of the touch input apparatus for a long time or an operation of executing a preset gesture on the touch input apparatus.

In one embodiment, the control unit 30 controls to start an music player software when detecting the first connection port 13 of the headphone 10 is separated from the second connection port 21 of the display apparatus 20, and controls the music player software to execute the above functions in response to the input signal input by the audio input unit 401 or the touch/key-press input unit 402.

Therein, the head-mounted device 1 further includes a storage unit 50 and a communication unit 60. The storage unit 50 is configured to store audio files such as songs. The communication unit 60 is configured to establish a communication connection with a network server or other devices. The storage unit 50 can be a flash memory, a random access memory (RAM) for temporary storage of information, a read-only memory (ROM) for permanent storage of information, a hard disk, a storage card, and etc. The communication unit 60 can be a network card, a WIFI module, a telephone card, or the like. The control unit 30 may be a central processing unit (CPU), a single chip, a digital signal processor, or the like.

Therein, the audio files such as songs played under the controlling of the control unit 30 maybe audio files stored in the storage unit 50, or audio files obtained from internet or other devices via the communication unit 60.

For example, the control unit 30 may control to start an audio player software when detecting the first connection port 13 of the headphone apparatus 10 is separated from the second connection port 21 of the display apparatus 20. The control unit 30 may control the audio player software to play children' song stored in the storage unit 50 or search children' song from the internet and then play the searched children' song, when determining a corresponding function is playing children' song according to the input signal of the input unit 40.

In one embodiment, the control unit 30 controls to start the communication unit 60 to connect to the internet or other devices when detecting the first connection port 13 of the headphone apparatus 10 is separated from the second connection port 21 of the display apparatus 20. In another embodiment, the control unit 30 controls to start the communication unit 60 and connects to the internet or other devices to obtain the audio files from the internet or other devices, only when determining a corresponding function is connecting to the internet or other devices according to the input signal of the input unit 40.

In one embodiment, the storage unit 50 further stores login information of a network server or an audio player software, when connecting to the network server or the audio player software and being need to log in, the control unit 30 further controls to log in automatically according to the login information. In another embodiment, the control unit 30 may further receives login information of the input signal input by the audio input unit 401, and logs in according to the login information. For example, the user may input login account and password via a speech manner, therefore, the speech content information of the input signal input by the audio input unit 401 would include information of login account and password, the control unit 30 may log in according to the information of login account and password after obtaining the information of login account and password. Thereafter, the control unit 30 may obtain the audio files from the logged in network or audio player software.

Therein, the control unit 30 connects to the first connection port 13, and judges whether the first connection port 13 is connected to the second connection port 21 of the display apparatus 20 by detecting a voltage level of the first connection port 13. For example, the first connection port 13 includes a connection detection pin (not shown), when the first connection port 13 is connected to the second connection port 21 of the display apparatus 20, the connection detection pin is at a high voltage level, when the first connection port 13 is disconnected to the second connection port 21 of the display apparatus 20, the connection detection pin is at a low voltage level. Thereby, the control unit 30 determines the first connection port 13 is connected to the second connection port 21 of the display apparatus 20 when detecting the voltage level of the connection detection pin of the first connection port 13 is the high voltage level; the control unit 30 determines the first connection port 13 is disconnected to the second connection port 21 of the display apparatus 20, namely at a separation state, when detecting the voltage level of the connection detection pin of the first connection port 13 is the low voltage level.

Therein, the headphone receiver 12 is configured to output sound when playing the audio file. The display apparatus 20 further includes a displayer and an optical module, the displayer is configured to generate display frames, the optical module is configured to projects the display frames to an exit pupil direction of the head-mounted device 100 via a preset path. The headphone apparatus 10 and the display apparatus 20 may further include other components, because they are unrelated to the present disclosure, here does not describe in detail.

Figure 3:
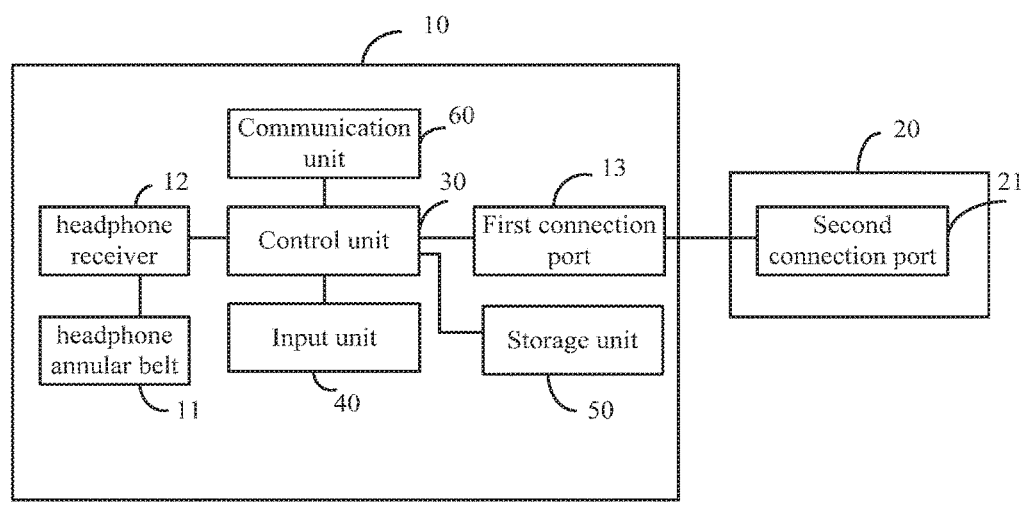
FIG. 3 is schematic diagram of a headphone apparatus, in accordance with an embodiment of the present disclosure.

Please referring to FIG. 3, which is a functional block diagram of the headphone apparatus 10 in accordance with one embodiment of the present disclosure. In the embodiment, the control unit 30, the input unit 40, the storage unit 50, and the communication unit 60 are set at the headphone apparatus 10. Thereby, when the display apparatus is separated from the headphone apparatus 10, the headphone apparatus 10 may be used as an audio playing device individually.

In another embodiment, the head-mounted device 10 may further include a control box (not shown), the control unit 30, the input unit 40, the storage unit 50, and the communication unit 60 are set at the control box. The control box connects to the headphone apparatus 10 via a data line, and is configured to execute the above control functions, at this time, the headphone apparatus 10 may be only used as a sound output device.

Please referring to FIG. 4, which is flowchart of a separation control method of the head-mounted device 100 of the present disclosure. Therein, the steps of the method are not limited to the sequences as follow. The method may include steps as follow.

At first, a control unit 30 detects whether a headphone apparatus 10 is separated from a display apparatus 20 (S401). If yes, then executing the step S403, else, returning to the step S401.

Controlling the head-mounted device 100 to enter an audio playing mode (S403).

The control unit 30 receives an input signal generated by an input unit 40 in response to an input operation, and controls to execute a corresponding audio playing control function according to the input signal (S405). Therein, the input unit 40 includes an audio input unit 401, the audio input unit 401 is configured to convert the user's speech to an input signal including speech content information, the control unit 30 controls to execute a corresponding audio playing control function according to the speech content information of the input signal. Therein, the input unit 40 further includes a touch/key-press input unit 402, the touch/key-press input unit 402 includes at least one of a touch input apparatus and a key-press input apparatus, the touch/key-press input unit 402 is configured to generate a corresponding touch signal and/or a key-press signal in response to user's operation. The control unit 30 controls to execute a corresponding audio playing control function according to the touch signal or key-press signal generated by the touch/key-press input unit 402.

Therein, the method further includes: the control unit 30 judges whether there is any function related to display is running when detecting the first connection port 13 of the headphone apparatus 10 is separated from the second connection port 21 of the display apparatus 20, if yes, then controls to close the functions related to the display automatically.

Therein, the method further includes: the control unit 30 controls to start a communication unit 60 to connect to an internet or other devices when detecting the first connection port 13 of the headphone apparatus 10 is separated from the second connection port 21 of the display apparatus 20.

Therein, the method further includes: the control unit 30 obtains login information stored in a storage unit or receives the login information of an input signal input by the audio input unit 401, and logs in the internet connected by the communication unit 60 according to the login information, and obtain audio files from the internet which has logged in.

The above is a preferred embodiment of the present invention, and it should be noted that those skilled in the art may make some improvements and modifications without departing from the principle of the present invention, and these improvements and modifications also are the protection scope of the present invention.

What is claimed is:

1. A head-mounted device, comprising a display apparatus and a headphone apparatus, the headphone apparatus comprising a first connection port, the display apparatus comprising a second connection port, the first connection port is capable of connecting to the second connection port or separating from the second connection port; wherein, the head-mounted device further comprising:
   an input unit, configured to generate an input signal in response to an input operation; and
   a control unit, configured to control the head-mounted device to enter an audio playing mode when detecting the first connection port of the headphone apparatus is separated from the second connection port of the display apparatus, wherein in the audio playing mode, the control unit receives the input signal generated by the input unit in response to the input operation and controls to execute corresponding audio playing control function according to the input signal.

2. The head-mounted device according to claim 1, wherein the input unit comprises an audio input unit, the audio input unit is configured to convert user's speech to an input signal containing speech content information; the control unit is configured to control to execute a corresponding audio playing function according to the speech content information of the input signal.

3. The head-mounted device according to claim 2, wherein when the speech content information of the input signal comprises a category of song, the control unit determines songs of the corresponding category and controls to play the songs of the corresponding category.

4. The head-mounted device according to claim 3, wherein when the speech content information of the input signal comprises a speech control command, the control unit controls to execute the speech control command in response to the speech control command of the input signal.

5. The head-mounted device according to claim 1, wherein the input unit comprises a touch/key-press input unit, the touch/key-press input unit comprises at least one of a touch input apparatus and a key-press input apparatus, the touch/key-press input unit is configured to generate a corresponding touch signal and/or a key-press signal in response to user's operation, the control unit controls to execute the corresponding audio playing control function in response to the touch signal or the key-press signal generated by the touch/key-press input unit.

6. The head-mounted device according to claim 5, wherein the control unit controls to switch the songs in response to a touch signal corresponding to a first touch operation; and/or controls to adjust a volume in response to a touch signal corresponding to a second touch operation; and/or controls to switch between states of pause playing songs and playing songs, in response to a touch signal corresponding to a third touch operation; and/or controls to loop play songs in response a touch signal corresponding to a fourth touch operation.

7. The head-mounted device according to claim 5, wherein the control unit controls to switch a song forward in response to a first key-press signal, and/or controls to switch a song backward in response to a second key-press signal, and/or controls to increase the volume in response to a third key-press signal, and/or controls to decrease the volume in response to a fourth key-press signal.

8. The head-mounted device according to claim 1, wherein the control unit further controls a system menu to jump to a music playing menu when detecting the first connection port of the headphone apparatus is separated from the second connection port of the display apparatus.

9. The head-mounted device according to claim 2, wherein the head-mounted device further comprises a storage unit and a communication unit; the storage unit is configured to store audio files comprising songs, the communication unit is configured to establish a communication connection with a network server or other devices, the control unit obtains the audio files from the storage unit or obtains audio files from internet or other devices via the communication unit, so as to be used to audio playing.

10. The head-mounted device according to claim 9, wherein the control unit is further configured to obtain login information stored in the storage unit or receive login information of the input signal generated by the audio input unit, and control to log in the internet connected by the communication unit according to the login information.

11. A headphone apparatus, comprising a first connection port configured to connect to a display apparatus; the headphone apparatus being configured to combine the display apparatus to form a head-mounted device; wherein, the headphone apparatus further comprising:
    an input unit, configured to generate an input signal in response to an input operation; and
    a control unit, configured to control the head-mounted device to enter an audio playing mode when detecting the first connection port of the headphone apparatus is separated from the second connection port of the display apparatus, wherein in the audio playing mode, the control unit receives the input signal generated by the input unit in response to the input operation and controls to execute corresponding audio playing control function according to the input signal.

12. The headphone apparatus according to claim 11, wherein the input unit comprises an audio input unit, the audio input unit is configured to convert user's speech to an input signal containing speech content information; the control unit is configured to control to execute a corresponding audio playing function according to the speech content information of the input signal.

13. The headphone apparatus according to claim 11, wherein the input unit comprises a touch/key-press input unit, the touch/key-press input unit comprises at least one of a touch input apparatus and a key-press input apparatus, the touch/key-press input unit is configured to generate a corresponding touch signal and/or a key-press signal in response to user's operation, the control unit controls to execute the corresponding audio playing control function in response to the touch signal or the key-press signal generated by the touch/key-press input unit.

14. The headphone apparatus according to claim 11, wherein the control unit further controls a system menu to jump to a music playing menu when detecting the first connection port of the headphone apparatus is separated from the second connection port of the display apparatus.

15. The headphone apparatus according to claim 12, wherein the head-mounted device further comprises a storage unit and a communication unit; the storage unit is configured to store audio files comprising songs, the communication unit is configured to establish a communication connection with a network server or other devices, the control unit obtains the audio files from the storage unit or obtains audio files from internet or other devices via the communication unit, so as to be used to audio playing.

16. The headphone apparatus according to claim 15, wherein the control unit is further configured to obtain login information stored in the storage unit or receive login information of the input signal generated by an audio input unit, and control to log in the internet connected by the communication unit according to the login information.

17. An separation control method for a head-mounted device, the method comprising:
  detecting whether a headphone apparatus of the head-mounted device is separated from a display apparatus of the head-mounted device;
  if yes, controlling the head-mounted device to enter an audio playing mode; and
  receiving an input signal generated by an input unit of the head-mounted device in response to an input operation, and controlling to execute a corresponding audio playing control function according to the input signal.

18. The separation control method according to claim 17, wherein the input unit comprises an audio input unit, the receiving an input signal generated by an input unit of the head-mounted device in response to an input operation, and controls to execute a corresponding audio playing control function according to the input signal comprises:
  receiving an input signal containing speech content information converted from user's speech by the audio input unit; and
  controlling to execute the corresponding audio playing function according to the speech content information of the input signal.

19. The separation control method according to claim 17, wherein the input unit comprises a touch/key-press input unit, the touch/key-press input unit comprises at least one of a touch input apparatus and a key-press input apparatus, the receiving an input signal generated by an input unit of the head-mounted device in response to an input operation, and controls to execute a corresponding audio playing control function according to the input signal comprises:
  receiving an touch signal or an key-press signal generated by the touch/key-press input unit in response to user's operation; and
  controlling to execute the corresponding audio playing control function in response to the touch signal or the key-press signal.

20. The separation control method according to claim 18, wherein the separation control method further comprises:
  obtaining stored login information or receive login information of the input signal generated by the audio input unit;
  controlling to log in an internet connected by the communication unit according to the login information; and
  obtaining audio files from the internet.

* * * * *